United States Patent
Chung et al.

(10) Patent No.: US 7,482,858 B2
(45) Date of Patent: Jan. 27, 2009

(54) TEMPERATURE-SENSITIVE CURRENT SOURCE

(75) Inventors: Shine Chung, Taipei Hsien (TW); Jonathan Hung, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 61 days.

(21) Appl. No.: 11/638,186

(22) Filed: Dec. 13, 2006

(65) Prior Publication Data
US 2008/0143449 A1    Jun. 19, 2008

(51) Int. Cl.
*G05F 1/10* (2006.01)
*G05F 3/02* (2006.01)

(52) U.S. Cl. ............ 327/538; 327/541; 327/543; 330/288; 323/315

(58) Field of Classification Search ......... 327/115–118, 327/538–543, 355–360, 202–218, 260–290, 327/530, 545, 546; 377/47, 48; 330/288; 323/313, 315
See application file for complete search history.

(56) References Cited
U.S. PATENT DOCUMENTS

| | | | |
|---|---|---|---|
| 4,536,702 A * | 8/1985 | Nagano | 323/316 |
| 5,300,837 A * | 4/1994 | Fischer | 327/281 |
| 6,404,275 B1 * | 6/2002 | Voldman et al. | 327/538 |
| 7,233,190 B2 * | 6/2007 | Tanzawa | 327/355 |
| 2004/0046614 A1 * | 3/2004 | Pigott | 331/57 |

OTHER PUBLICATIONS

Wikipedia—MOSFET http://en.wikipedia.org/wiki/MOSFET.*
Design and Analysis of Integrator-Based Log Domain Filter Circuits 1.1 Conventional Continuous-Time Integrated Filters 1.1.1 MOS-C Filters.*

* cited by examiner

*Primary Examiner*—Long Nguyen
*Assistant Examiner*—Brandon S Cole
(74) *Attorney, Agent, or Firm*—K & L Gates LLP

(57) ABSTRACT

A temperature-sensitive current source includes a first MOS transistor having a source coupled to a first voltage; a second MOS transistor having a source coupled to the first voltage, and a gate coupled to a gate of the first MOS transistor, such that a current output at a drain of the second MOS transistor mirrors a current passing across the first MOS transistor; and a resistor coupled between the source and a drain of the first MOS transistor in parallel, such that the current passing across the first MOS transistor is substantially larger than a current passing through the resistor, wherein the first and second MOS transistors operate in a saturation mode, such that the output current at the drain of the second MOS transistor is responsive to a change of temperature.

18 Claims, 4 Drawing Sheets

TEMPERATURE-SENSITIVE CURRENT SOURCE

BACKGROUND

The present invention relates generally to integrated circuit (IC) designs, and more particularly to a temperature-sensitive current source for reliably generating current based on its temperature.

A DRAM device must be constantly refreshed in order to retain data. It is known by those skilled in the art that the data refresh rate depends upon the temperature of the DRAM device. FIG. 1 illustrates a graph 100 showing a relationship between the temperature of a DRAM device and its required data refresh time, which is reversely proportional to the data refresh rate. The x-axis of the graph 100 represents the temperature of a DRAM device, and the y-axis represents the time required to refresh the data stored in the DRAM device. Area A represents the time-and-temperature coordinates that should not be used for data refresh, due to reliability concerns. Area C represents the time-and-temperature coordinates that should not be used for data refresh, due to power consumption concerns. Area B represents the time-and-temperature coordinates that are acceptable for data refresh designs. As shown in the figure, as the temperature of the DRAM device increases, the acceptable data refresh time decreases, meaning that the data refresh rate needs to be increased.

An increase in data refresh rate leads to a higher power consumption. In order to optimize the tradeoff between power consumption and data retention, it is desirable to design the DRAM device in a way that it refreshes data at a lower rate as its temperature is low, and at a higher rate as its temperature is high. A temperature-controlled oscillator is typically implemented in the DRAM device to adjust the data refresh rate based on the temperature. The temperature-controlled oscillator typically includes a conventional temperature-sensitive current source that supplies current with its amount depending on the temperature thereof.

The conventional current source design typically utilizes one or more transistors operating in a sub-threshold region in order to provide a high current variation in response to a change of temperature. However, because the conventional current source operates in a sub-threshold region, it may be particularly susceptible to process variations, and therefore suffers from reliability issues. This renders the conventional current source impractical or unsuitable for use by DRAM devices.

As such, it is desirable to design a temperature-sensitive current source that can generate current responses to a change of temperature in a reliable manner.

SUMMARY

The present invention discloses a temperature-sensitive current source. In one embodiment of the invention, the temperature-sensitive current source includes a first MOS transistor having a source coupled to a first voltage; a second MOS transistor having a source coupled to the first voltage, and a gate coupled to a gate of the first MOS transistor, such that a current output at a drain of the second MOS transistor mirrors a current passing across the first MOS transistor; and a resistor coupled between the source and a drain of the first MOS transistor in parallel, such that the current passing across the first MOS transistor is substantially larger than a current passing through the resistor, wherein the first and second MOS transistors operate in a saturation mode, such that the output current at the drain of the second MOS transistor is responsive to a change of temperature.

The construction and method of operation of the invention, however, together with additional objectives and advantages thereof will be best understood from the following description of specific embodiments when read in connection with the accompanying drawings.

DESCRIPTION

This invention is directed to a temperature-sensitive current source that generates current in response to a change of temperature in a reliable manner. The following merely illustrates the various embodiments of the present invention for purposes of explaining the principles thereof. It is understood that those skilled in the art will be able to devise various equivalents that, although not explicitly described herein, embody the principles of this invention.

Figure 1:
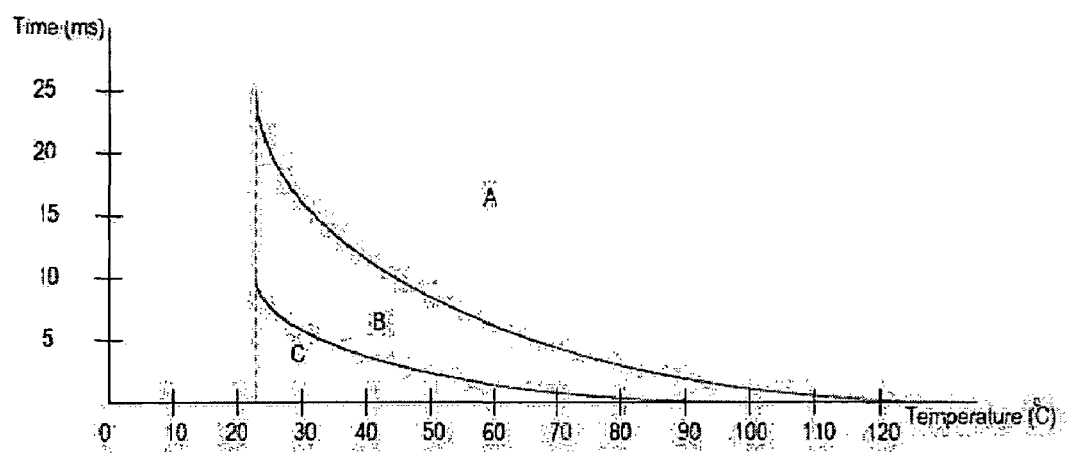
FIG. 1 illustrates a graph 100 showing a relationship between the temperature of a DRAM device and its required data refresh time.
Figure 2:
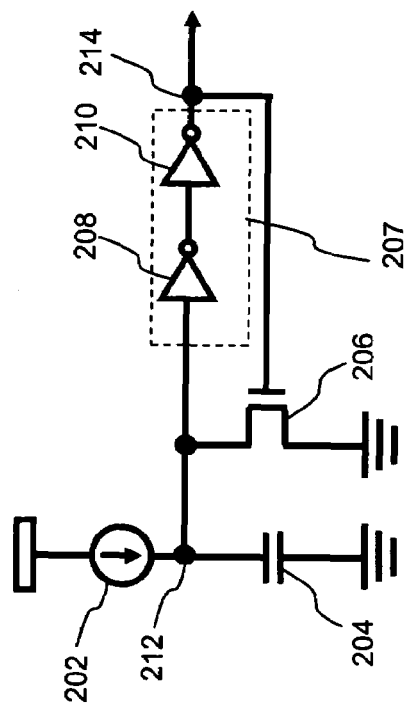
FIG. 2 schematically illustrates a temperature-controlled oscillator circuit for generating current to refresh data retained in a DRAM device in accordance with one embodiment of the present invention.

FIG. 2 schematically illustrates a temperature-controlled oscillator circuit 200 that is suitable, for example, to generate current to refresh data retained in a DRAM device in accordance with one embodiment of the present invention. The temperature-controlled oscillator circuit 200 includes a temperature-sensitive current source 202, a capacitor 204, a switch device, such as an NMOS transistor 206, a comparator module 207, which is further comprised of two serially coupled inverters 208 and 210 to output a logic 1 when the input exceeds a threshold. One of the terminals of the temperature-sensitive current source 202 is coupled to a supply voltage, while the other terminal is tied to an input terminal of the inverter 208 used as a comparator, the drain of the NMOS transistor 206, and the capacitor 204 via node 212. The temperature-sensitive current source 202 is designed to charge the capacitor 204 at the beginning of the operation. When the voltage at the capacitor is charged to a point that is higher than the trip point of the inverter 208, the inverter 208 outputs a low signal which, in turn, is flipped again by the inverter 210 to provide a high signal at a node 214, which is connected to an output terminal of the inverter 210. This output signal at the node 214 is denoted as the output voltage Vout. The output voltage Vout at the node 214 is also fed back to the gate of the NMOS transistor 206 to control the oscillating output of the temperature-controlled oscillator circuit 200. The high output voltage Vout, when exceeding the threshold voltage of the NMOS transistor 206, will turn on the NMOS transistor 206 and discharge the capacitor 204. Once discharged, another cycle begins by charging up the capacitor 204 again. After multiple cycles of charging and discharging the capacitor 204, a saw-tooth-shaped waveform can be generated at the output node 214.

The current source 202 generates current based on its temperature. When the temperature increases, the amount of current generated by the current source 202 increases, thereby increasing the frequency of the oscillating output voltage Vout at the node 214. When the temperature decreases, the amount of the current generated by the current source 202 decreases, thereby decreasing the frequency of the oscillating output voltage at the node 214.

Figure 3:
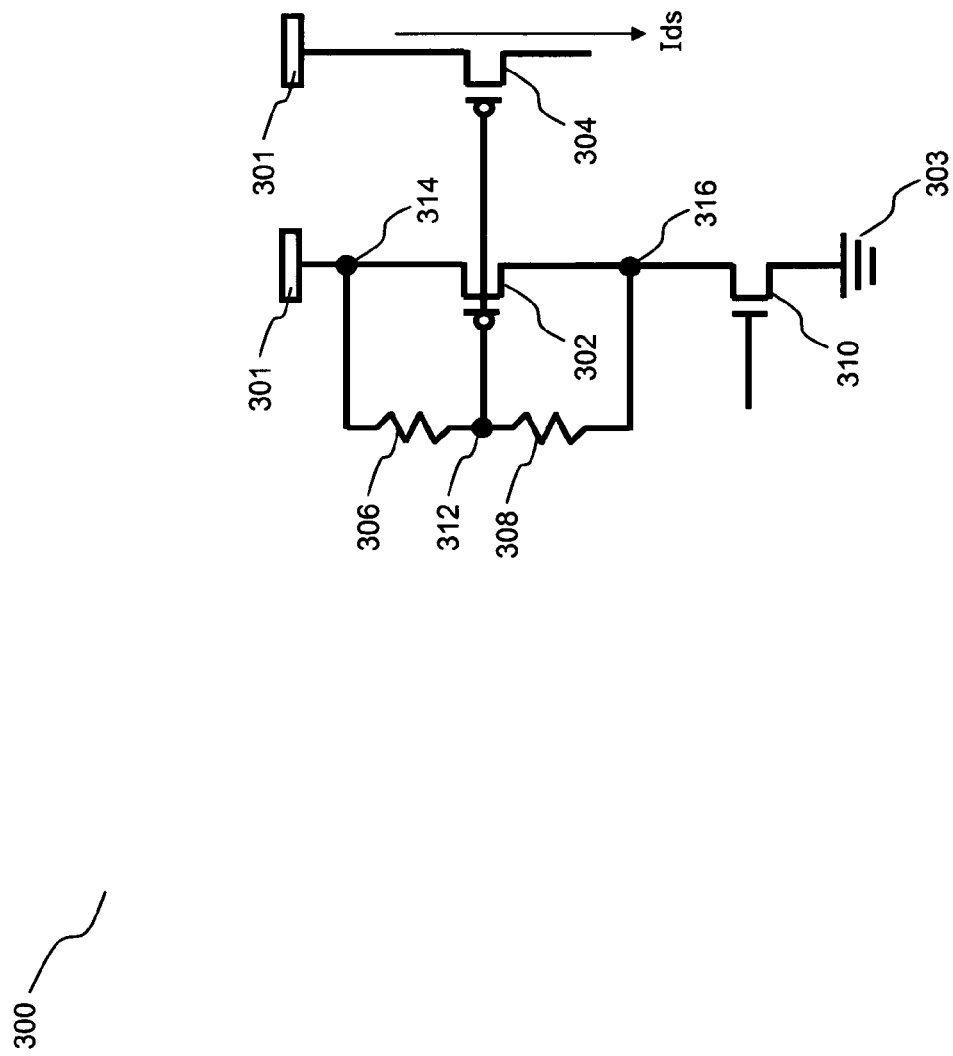
FIG. 3 schematically illustrates a temperature-sensitive current source for generating current based on the temperature in accordance with one embodiment of the present invention.

FIG. 3 schematically illustrates a temperature-sensitive current source 300 for generating current based on its temperature in accordance with one embodiment of the present invention. The temperature-sensitive current source 300 is one example among the possible designs of the current source 202 shown in FIG. 2. The temperature-sensitive current source 300 is comprised of two PMOS transistors 302 and 304, two resistors 306 and 308, and an NMOS transistor 310. The sources of the PMOS transistors 302 and 304 are both coupled to the first voltage 301, while both gates of the PMOS transistors 302 and 304 are coupled together at a node 312. The resistor 306 is coupled to both the first voltage 301 and the source of the PMOS transistor 302 through a node 314. The resistor 308 is connected to both the drains of the PMOS transistor 302 and the NMOS transistor 310 through a node 316. The NMOS transistor 310, which is controlled by a bias voltage Vb at its gate, also has its source coupled to a second voltage 303.

In this embodiment, the first voltage 301 is higher than the second voltage 303. For example, the first voltage 301 can be a supply voltage, such as VDD, and the second voltage 303 can be a complementary supply voltage, such as VSS or ground. It is noteworthy that in another embodiment where the PMOS transistors 302 and 304 are replaced by NMOS transistors, and the NMOS transistor 310 is replaced by a PMOS transistor, the second voltage 303 would be designed to be higher than the first voltage 301.

The resistance of the resistors 306 and 308 are designed to keep the gate-to-source voltage Vgs of the PMOS transistor 302 to be smaller than the threshold voltage thereof, such that the PMOS transistor 302 can be turned on and operates in a saturation mode. The bias voltage Vb turns on the NMOS transistor 310 to create a current path from the first voltage 301 to the second voltage 303 through the PMOS transistor 302. The resistance of the resistors 306 and 308 are also designed in a way that the current flowing through the resistors 306 and 308 is much smaller than that flowing across the PMOS transistor 302. It is suggested that the resistance of the resistor 306 approximately ranges from 10 to 100 Kohm, and the resistance of the resistor 308 approximately ranges from 10 to 100 Kohm.

The current flowing across the PMOS transistor 302 is also known as a drain-to-source saturation current Ids, which can be expressed mathematically as follows:

$$Ids = \frac{1}{2} Kp \left(\frac{W}{L}\right)(Vgs - |Vtp|)^2 (1 + \lambda Vds)$$

where Kp is a constant associated with the PMOS transistor 302, W/L is the width to length ratio of the transistor, λ is the channel length modulation constant, and Vds is the drain source voltage. It is understood that the threshold voltage Vtp of the PMOS transistors 302 changes as its temperature changes. As shown in the above equation, the drain-to-source saturation current Ids across the PMOS transistor 302 changes as the threshold voltage Vtp changes.

The current path across the PMOS transistor 304 functions as a current mirror of the current path across the PMOS transistor 302. The sources of the PMOS transistors 302 and 304 are coupled to the same voltage 301, and the gates thereof are tied together. As a result, the output current at the drain of the PMOS transistor 304 mirrors the drain-to-source saturation current Ids across the PMOS transistor 302. Thus, the current sensed at the drain of the PMOS transistor 304 is responsive to a change of temperature.

One advantage of the proposed current source 300 is that because the PMOS transistors 302 and 304 operate in a saturation mode, instead of a sub-threshold mode, its output current would be less susceptible to process variations. Thus, the reliability of the proposed current source 300 is improved.

Figure 4:
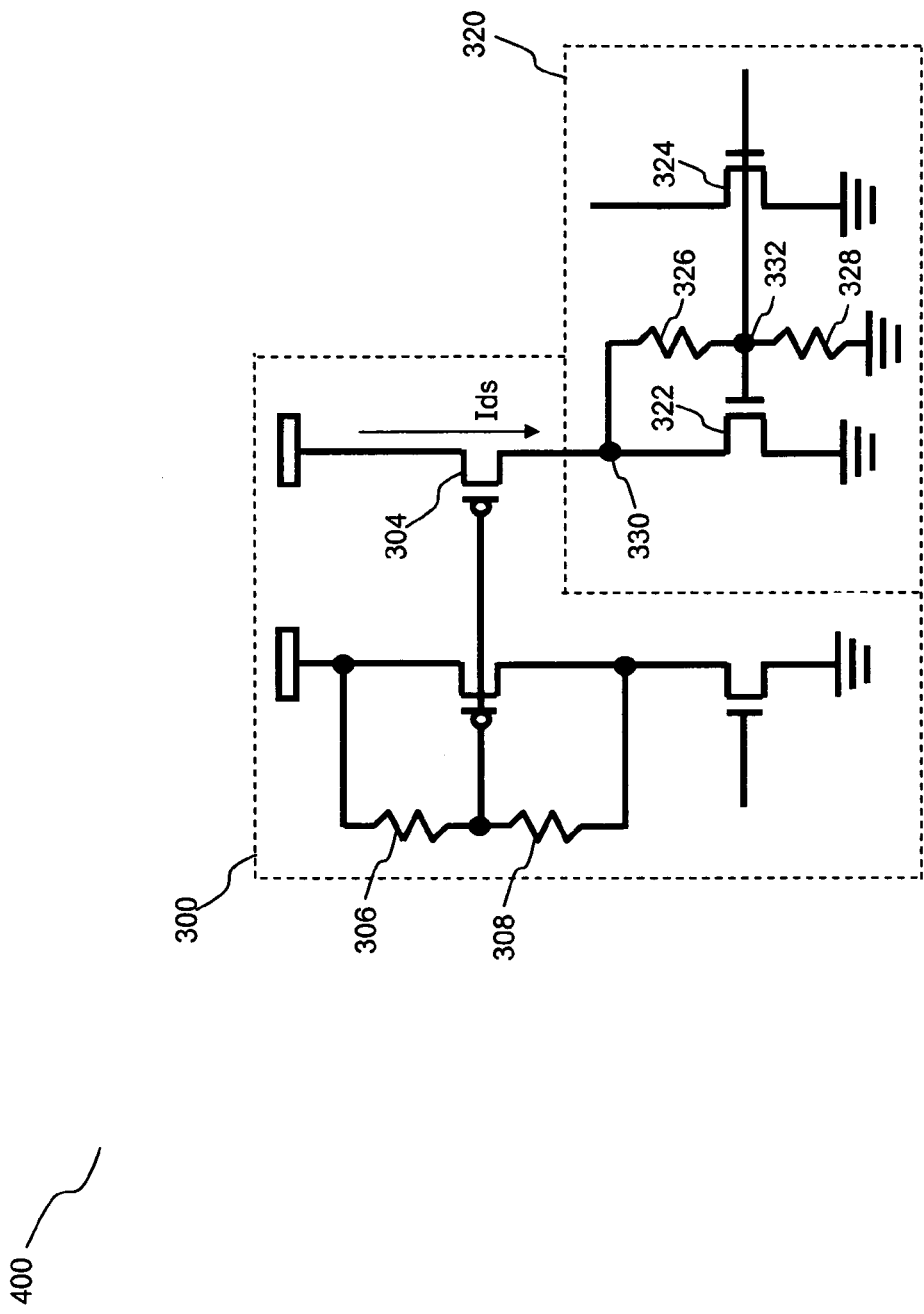
FIG. 4 schematically illustrates a multi-stage temperature-sensitive current source for generating current based on the temperature in accordance with another embodiment of the present invention.

FIG. 4 schematically illustrates a multi-stage temperature-sensitive current source 400 for generating current based on the temperature in accordance with another embodiment of the present invention. The temperature-sensitive current source 400 is comprised of two stages of temperature-sensitive current sources 300 and 320. The temperature-sensitive current source 300 shown in FIG. 3 is used as a first stage of current source in this embodiment. The second stage of current source 320 differs from the first stage of current source 300 in utilizing NMOS transistors such as NMOS transistors 322 and 324, instead of PMOS transistors. Like the temperature-sensitive current source 300 shown in FIG. 3, the second stage of current source 320 is comprised of a pair of resistors 326 and 328 used for biasing the NMOS transistor 322.

The first stage of current source 300 is coupled to the second stage of current source 320 at a node 330 where the drain of the PMOS transistor 304 is coupled with the resistor 326 and the drain of the NMOS transistor 322. Both resistors 326 and 328 are tied to the gates of the NMOS transistors 322 and 324 via a node 332. The sources of the NMOS transistors 322 and 324 and one terminal of the resistor 328 are all coupled to a complementary supply voltage, such as VSS or ground. The second stage of current source 320 operates in a manner similar to the first stage of current source 300 in the sense that it allows the current flowing through the NMOS transistor 322 to change as the temperature changes. The current flowing across the NMOS transistor 324 mirrors the current flowing across the NMOS transistor 322. Thus, the current sensed at the drain of the NMOS transistor 324 is responsive to a change of temperature.

With multiple stages of current source implemented, the current variation induced by a change of temperature can be amplified. For example, if each stage can amplify the current by 50% when temperature changes from 25° C. to 125° C., two stages of the proposed current sources can provide 2.25 times the current increase when the temperature changes from 25° C. to 125° C. By implementing four to five stages of the proposed current sources, current can be increased by 6 to 8 times when the temperature changes from 25° C. to 125° C.

It is noteworthy that in another embodiment, the NMOS transistors 332 and 324 can be replaced by PMOS transistors, and the PMOS transistors in the first stage of current source 300 can be replaced by NMOS transistors with the polarity of the first and second supply voltages reversed. It is further noted that the type of MOS transistors is a matter of design choice, which dose not limit the scope of the present invention.

By implementing the proposed temperature-sensitive current source in an oscillator circuit, the oscillator circuit can operate relatively reliably, notwithstanding that its properties may vary due to process variations. When the temperature changes, the frequency of the signal output from the oscillator changes responsively. As a result, the oscillator can be used to adjust the data refresh rate of a DRAM device in response to a change of temperature. The proposed temperature-sensitive current source may optionally include multiple stages of current source, therefore to provide a better, more sensitive temperature control mechanism for the oscillator.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A temperature-sensitive current source comprising:
   a first MOS transistor having a source coupled to a first voltage;
   a second MOS transistor having a source coupled to the first voltage, and a gate coupled to a gate of the first MOS transistor, such that a current output at a drain of the second MOS transistor mirrors a current passing across the first MOS transistor;
   a resistor set including a first resistor and a second resistor coupled in series between the source and a drain of the first MOS transistor in parallel, such that the current passing across the first MOS transistor is substantially larger than a current passing through the resistor set, wherein a resistance of the resistor set is designed to operate the first and second MOS transistors in a saturation mode, such that the output current at the drain of the second MOS transistor is responsive to a change of temperature; and
   a third MOS transistor coupled between the drain of the first MOS transistor and a second voltage lower than the first voltage.

2. The temperature-sensitive current source of claim 1, wherein the first MOS transistor has a threshold voltage that varies depending on the temperature thereof.

3. The temperature-sensitive current source of claim 1, wherein the first and second MOS transistors are PMOS transistors.

4. The temperature-sensitive current source of claim 1, wherein a gate of the third MOS transistor is controlled by a bias voltage to create a current path from the first voltage to the second voltage.

5. The temperature-sensitive current source of claim 1, wherein the first and second MOS transistors are NMOS transistors.

6. A temperature-controlled oscillator comprising:
   a comparator module having an input terminal and an output terminal;
   a capacitor having a first electrode coupled to the input terminal of the comparator module, and a second electrode coupled to the complementary supply voltage;
   a switch device coupled between the input terminal of the comparator module and a complementary supply voltage for discharging the capacitor in response to a voltage at the output terminal of the comparator module;
   a temperature-sensitive current source coupled between a supply voltage and the first electrode of the capacitor for generating a current depending on a temperature thereof to charge the capacitor, wherein the temperature-sensitive current source comprises:
   a first MOS transistor having a source coupled to a first voltage;
   a second MOS transistor having a source coupled to the first voltage, and a gate coupled to a gate of the first MOS transistor, such that a current output at a drain of the second MOS transistor mirrors a current passing across the first MOS transistor; and
   a resistor set including a first resistor and a second resistor coupled in series between the source and a drain of the first MOS transistor in parallel, such that the current passing across the first MOS transistor is substantially larger than a current passing through the resistor set, wherein a resistance of the resistor set is designed to operate the first and second MOS transistors in a saturation mode, such that the output current at the drain of the second MOS transistor is responsive to a change of temperature; and
   a third MOS transistor coupled between the drain of the first MOS transistor and a second voltage lower than the first voltage.

7. The temperature-controlled oscillator of claim 6, wherein the first MOS transistor has a threshold voltage that varies depending on the temperature thereof.

8. The temperature-controlled oscillator of claim 6, wherein the first and second MOS transistors are PMOS transistors.

9. The temperature-controlled oscillator of claim 6, wherein a gate of the third MOS transistor is controlled by a bias voltage to create a current path from the first voltage to the second voltage.

10. The temperature-controlled oscillator of claim 6, wherein the first and second MOS transistors are NMOS transistors.

11. The temperature-controlled oscillator of claim 6, wherein the switch device is an NMOS transistor having a drain coupled to the input terminal of the comparator module, a gate coupled to the output terminal of the comparator module, and a source coupled to the complementary supply voltage.

12. The temperature-controlled oscillator of claim 6, wherein the comparator module comprises at least two serially coupled inverters.

13. A multi-stage temperature-sensitive current source comprising:
   a first stage of current source further comprising:
   a first MOS transistor having a source coupled to a first voltage;
   a second MOS transistor having a source coupled to the first voltage, and a gate coupled to a gate of the first MOS transistor, such that a current output at a drain of the second MOS transistor mirrors a current passing across the first MOS transistor;
   a first resistor set including a first resistor and a second resistor coupled in series between the source and a drain of the first MOS transistor in parallel, such that the current passing across the first MOS transistor is substantially larger than a current passing through the first resistor set, wherein a resistance of the first resistor set is designed to operate the first and second MOS transistors in a saturation mode, such that the output current at the drain of the second MOS transistor is responsive to a change of temperature;
   a second stage of current source further comprising:
   a third MOS transistor coupled between the drain of the second MOS transistor and a second voltage;
   a fourth MOS transistor having a source coupled to the second voltage, and a gate coupled to a gate of the third MOS transistor, such that a current output at a drain of the fourth MOS transistor mirrors a current passing across the third MOS transistor;
   a second resistor set including a third resistor and a fourth resistor coupled in series between the source and a drain of the third MOS transistor in parallel, such that the current passing across the third MOS transistor is substantially larger than a current passing through the second resistor set, wherein a resistance of the second resistor set is designed to operate the third and fourth MOS transistors in a saturation mode, such that the output current at the drain of the fourth MOS transistor is responsive to a change of temperature, wherein the first, second, third and fourth MOS transistors operate in a saturation mode, such that the output current at the drain of the fourth MOS transistor is responsive to a change of temperature.

14. The multi-stage temperature-sensitive current source of claim 13, wherein the first, second, third and fourth MOS transistors have threshold voltages that vary depending on a temperature thereof.

15. The multi-stage temperature-sensitive current source of claim 13, wherein the first and second MOS transistors are PMOS transistors, and the third and fourth MOS transistors are NMOS transistors.

16. The multi-stage temperature-sensitive current source of claim 15, further comprising an fifth NMOS transistor coupled between the drain of the first MOS transistor and the second voltage that is lower than the first voltage.

17. The multi-stage temperature-sensitive current source of claim 16, wherein a gate of the fifth NMOS transistor is controlled by a bias voltage to create a current path from the first voltage to the second voltage through the first MOS transistor.

18. The multi-stage temperature-sensitive current source of claim 13, wherein the first and second MOS transistors are NMOS transistors, and the third and fourth MOS transistors are PMOS transistors.

* * * * *